United States Patent
Shevket et al.

(10) Patent No.: US 6,886,987 B2
(45) Date of Patent: May 3, 2005

(54) HUB-BEARING ASSEMBLY FOR A DRIVING WHEEL OF A VEHICLE, PARTICULARLY A TRUCK

(75) Inventors: Cengiz Ratip Shevket, Novi, MI (US); Marco Brunetti, Turin (IT)

(73) Assignee: SKF Indunstrie S.p.A., Turin (IT)

( * ) Notice: Subject to any disclaimer, the term of this patent is extended or adjusted under 35 U.S.C. 154(b) by 0 days.

(21) Appl. No.: 10/437,728

(22) Filed: May 13, 2003

(65) Prior Publication Data

US 2003/0219186 A1 Nov. 27, 2003

(30) Foreign Application Priority Data

May 23, 2002 (IT) .................................. TO20020107 U

(51) Int. Cl.[7] .......................... F16C 33/36; B60B 27/02
(52) U.S. Cl. .................................. 384/589; 301/105.1
(58) Field of Search ................................ 384/544, 589, 384/537, 584, 585; 301/105.1, 111, 137

(56) References Cited

U.S. PATENT DOCUMENTS

| | | | | |
|---|---|---|---|---|
| 4,702,526 A | * | 10/1987 | Sankey | 301/105.1 |
| 5,536,098 A | * | 7/1996 | Schwarzler | 384/544 |
| 5,603,554 A | * | 2/1997 | Monroe et al. | 301/105.1 |
| 6,062,737 A | * | 5/2000 | Thienes | 384/589 |
| 6,299,360 B1 | * | 10/2001 | Dougherty et al. | 384/589 |
| 6,648,518 B2 | * | 11/2003 | Uchman | 384/544 |
| 2002/0070506 A1 | | 6/2002 | Krude | |

* cited by examiner

*Primary Examiner*—Thomas R. Hannon
(74) *Attorney, Agent, or Firm*—Merchant & Gould P.C.

(57) ABSTRACT

An annular hub (11) has flange (2) for connecting to a wheel and an axial cylindrical surface (14) for mounting a bearing unit (7). An intermediate annular member (30) is coupled for rotation to a driving axle shaft (1) by a first toothed/splined coupling (21, 31) and to the hub (11) by a second toothed/splined coupling (22, 32).

6 Claims, 2 Drawing Sheets

HUB-BEARING ASSEMBLY FOR A DRIVING WHEEL OF A VEHICLE, PARTICULARLY A TRUCK

The present invention refers to a hub-bearing assembly for a driving wheel of a vehicle particularly a light truck.

Figure 2:
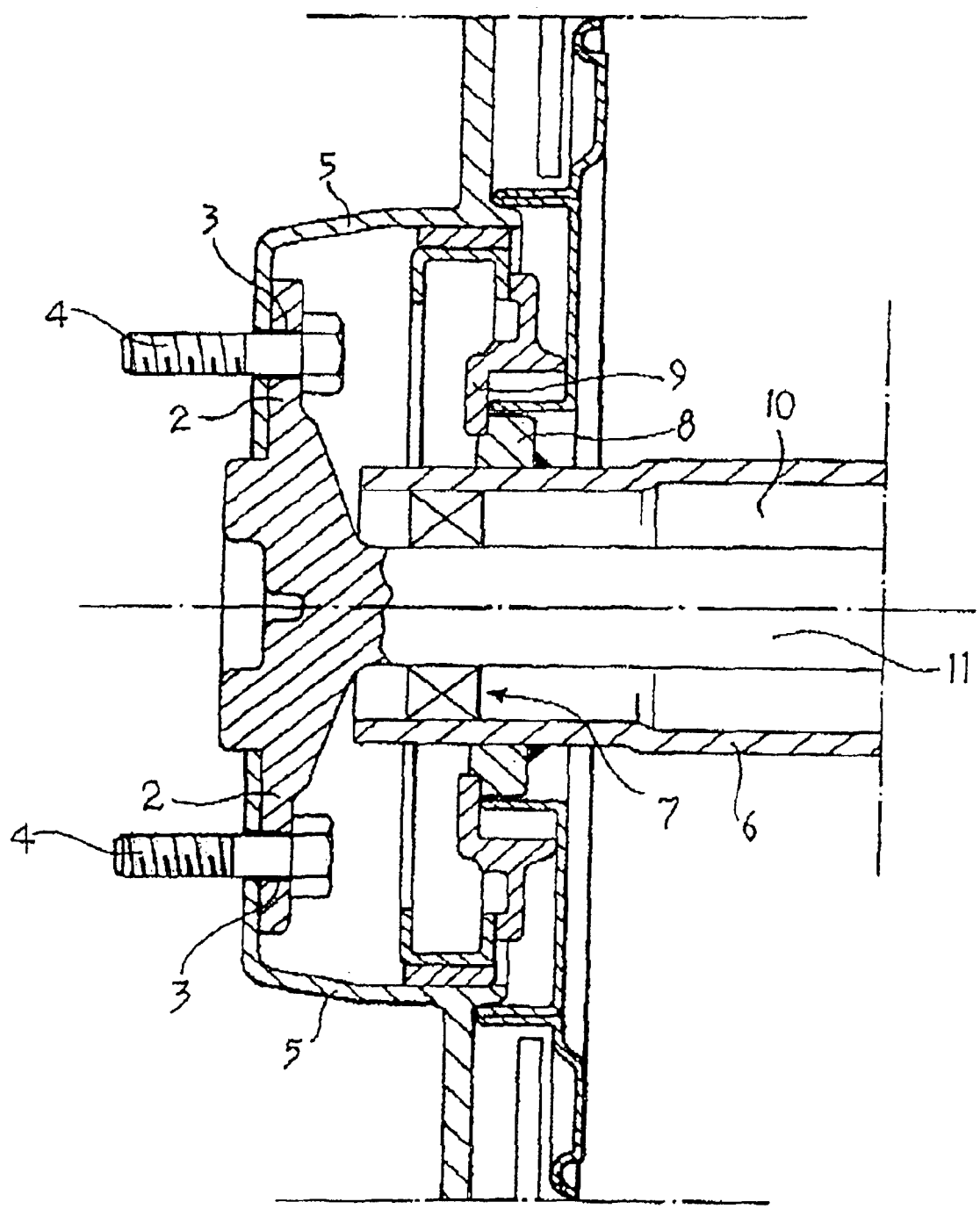

For a better understanding of the state of the art and problems relating thereto, there will be at first described a hub-wheel assembly of conventional design, shown in FIG. 2 of the attached drawings.

With reference to FIG. 2, a hub 11 of elongated form has a flanged portion 2 with axial bores 3 for bolts 4 for fastening to a brake disc 5. The hub 11 is accommodated in a stationary tubular housing 6 and rotatably supported by means of a bearing unit, schematically indicated 7, which is radially interposed between the tubular housing 6 and the cylindrical part of the hub 11. The bearing unit 7 is of the so-called first generation type, comprising a stationary outer ring, a rotatable inner ring and rolling bodies interposed therebetween. For supporting a brake member 9, an annular member 8 is welded on the outer surface of the tubular housing 6. The cylindrical gap 10 defined between the cylindrical part of the hub 11 and the housing 6 is normally filled with lubricant oil.

An object of the present invention is to provide a hub-bearing assembly that may simplify assembling and maintenance operations.

An other object of the invention is to make use of a hub and a bearing of smaller size with respect to the above discussed prior art, with a consequent saving of weight and costs.

These and other objects and advantages, that will be better understood hereinafter, are attained according to the present invention by a hub-bearing assembly as defined in the appended claims.

Figure 1:
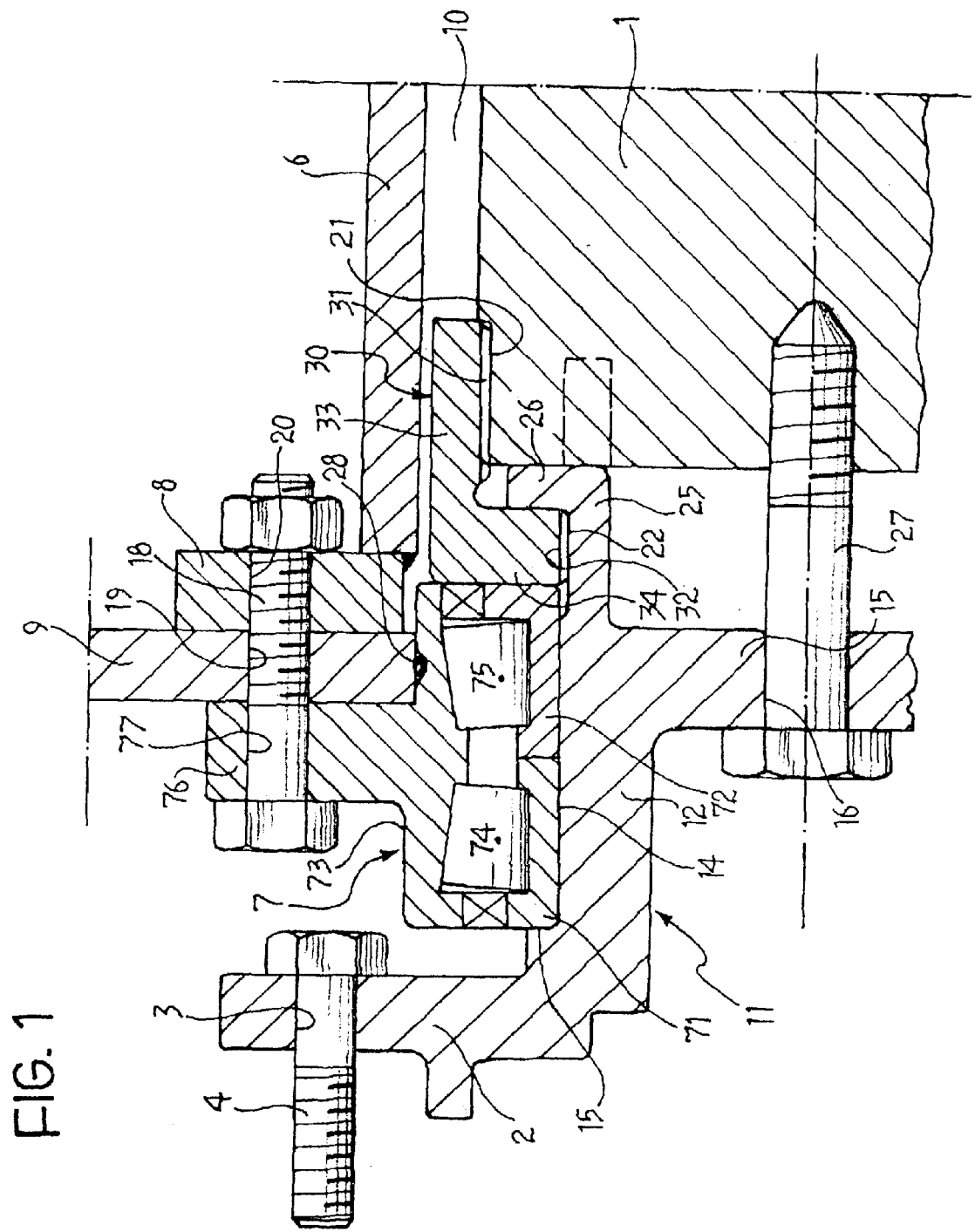

There will now be described, by way of a non-limiting example, a preferred embodiment of a hub-bearing assembly according to the present invention, reference being made to the accompanying drawings in which:

FIG. 1 is a partially sectioned axial cross-sectional view of an embodiment of a hub-bearing assembly according to the invention; and FIG. 2 is a schematic axial cross-section of a hub-bearing unit of conventional design.

With reference to FIG. 1, and using the same reference numerals already adopted in FIG. 2 to indicate equal or like parts, numeral 1 indicates an axle shaft for a driving wheel (not shown) of a motor vehicle, particularly a light truck. Naturally, reference to this possible field of use should not be interpreted as in any way limiting the scope of the patent.

The axle shaft 1 is accommodated in a conventional stationary tubular housing 6 on the outer surface of which there is welded an annular member 8 constituting a flange for supporting a brake bracket 9.

An annular hub indicated 11 is formed separately from the axle shaft 1 and coupled for rotation and axially thereto, as will be described in detail in the following. The hub 11 has a central axial tubular portion 12. At the axially outer end, the hub 11 forms a radial flange portion 2 extending in a radially outer direction with axial bores 3 for bolts 4 for fastening to a wheel and a brake disc (not shown). At the side of the outer flange 2, the tubular portion 12 has an outer surface of cylindrical shape 14 joining a radial shoulder surface 15.

A bearing unit 7 of the so-called second generation is mounted on the cylindrical surface 14 of the hub, at a position outside the tubular housing 6. The bearing unit includes a pair of radially inner half-races 71, 72 axially located side-to-side and fast for rotation with the hub, a radially outer stationary race 73, and a dual set of rolling bodies 74, 75 (preferably cone rollers) radially interposed between the outer race 73 and the inner half-races 71, 72. The outer race 73 forms a radially outwardly extending flange 76 in which there are obtained axial bores 77 for bolts 18 for fastening to the stationary tubular housing 6. The fastening bolts 18 pass through axially aligned bores 19 and 20 obtained in the brake bracket 9 and the annular flange 8 of the tubular housing 6, respectively.

In order to transmit the driving torque from the axle shaft 1 to the hub 11, these two members are coupled for rotation by an intermediate annular member 30 having a first internal toothing or spline 31 coupled with a corresponding outer toothing or spline 21 formed on the end portion of the axle shaft 1, and a second inner toothing or spline 32 coupled with a corresponding outer toothing or spline 22 formed on the hub 11. The outer spline 22 of the hub is formed on the cylindrical surface 12 of the hub at a zone adjacent to the zone where the inner half-race 72 of the bearing is fitted. In the preferred embodiment shown in the drawing, the intermediate annular member 30 has a substantially L-shaped axial cross-section, with a tubular or cylindrical axial portion 33 forming internally the first toothing or spline 31, and a radial flange portion 34 the central opening of which forms the second internal spline or toothing 32.

The hub 11 forms a tubular portion 25 (shown in phantom line in its initial indeformed condition) protruding beyond the flange portion 34 of the intermediate annular member 30. After the annular member 30 has been fitted onto the tubular portion 25, the part of this which protrudes beyond the flange portion 34 is cold deformed, preferably by rolling, in a radially outer direction against the flange portion 34 so as to form a plastically deformed edge 26. The deformed edge 26 axially locks the annular intermediate member 30 on the hub and eliminates axial play between the opposite shoulder 15 of the hub, the inner half-races 71, 72 and the intermediate annular member 30. In this way the bearing unit 7 remains axially pre-loaded onto the hub.

Then, the hub 11 is clamped axially to the axle shaft 1 by means of a central bolt 27 fitted into a central axial bore 16 formed by a radial flange portion 15 extending in a radially inner direction from the tubular portion 12 of the hub. Finally, after having rotated the outer race 73 so as to align the bores 77 with the bores 19 and 20 of the brake bracket 9 and the annular flange 8, the bolts 18 for fastening to the tubular housing 6 are inserted and tightened.

At the interface between the bearing outer race 73 and the brake bracket 9 there is fitted an O-ring 28 hermetically sealing the cylindrical gap 10 defined between the axle shaft 1 and the housing 6 and containing lubricant oil.

While a specific embodiment of the invention has been disclosed, it is to be understood that such disclosure is to be regarded as an exemplary embodiment of the hub-bearing assembly, and that modifications concerning the shape and location of parts, and constructional and functional details may be carried out.

What is claimed is:

1. A hub-bearing assembly for a driving wheel of a truck, comprising:
    an annular hub (11) with a flange portion (2) for connecting to a wheel and an axial cylindrical surface (14) for mounting a bearing unit (7);
    an intermediate annular member (30) for coupling for rotation to a driving axle shaft (1) by means of a first toothed/splined coupling (21, 31) and fast for rotation with the hub (11) by means of a second toothed/splinod coupling (22, 32), further comprising a bearing unit (7) mounted onto the hub (11) at position outside a stationary tubular housing (6) for the driving axle shaft (1).

2. The assembly of claim 1, wherein the bearing unit (7) includes:

at least one radially inner rotatable race (71, 72) locked onto the cylindrical surface (14) of the hub (11), a radially outer stationary race (73) forming a flange for connecting to the tubular housing (6).

3. The assembly of claim 2, wherein the flanged outer race (73) of the bearing unit (7) can be locked onto the tubular housing (6) by means of bolts (18) inserted through axial bores which can be aligned with one another and which are obtained respectively in the flange (76) of the outer race (73) and in an annular flange member (8) are secured to or integral with the tubular housing (6).

4. The assembly of claim 3, wherein the fastening bolts (18) are also inserted through axial bores (19) of a brake member (9) which can be locked between the flange (76) of the outer race (73) and the flange member (8) of the tubular housing (6).

5. The assembly of claim 3, further comprising sealing means (28) disposed between the outer race (73) of the bearing and the brake member (9) or the flange member (8) of the tubular housing, for sealing the cylindrical gap (10) between the axle shaft (1) and the housing (6).

6. A hub-bearing assembly for a driving wheel of a truck, comprising:

an annular hub (11) with a flange portion (2) for connecting to a wheel and an axial cylindrical surface (14) for mounting a bearing unit (7);

an intermediate annular member (30) for coupling for rotation to a driving axle shaft (1) by means of a first toothed/splined coupling (21, 31) and fast for rotation with the hub (11) by means of a second toothed/splined coupling (22, 32), wherein the toothings or splines (31, 32) of the intermediate annular member (30) are inner toothings/splines.

* * * * *